3,522,215
IMPACT RESISTANT AMORPHOUS
COPOLYESTERS
Kashinath S. Sardessai, Menlo Park, and Michel E. Mullier, Princeton Junction, N.J., assignors to Mobil Oil Corporation, a corporation of New York
No Drawing. Filed June 5, 1967, Ser. No. 643,344
Int. Cl. C08g 17/08, 33/10
U.S. Cl. 260—75                    7 Claims

ABSTRACT OF THE DISCLOSURE

Amorphous copolyesters having a high heat distortion temperature and a high impact strength are prepared by copolyesterification of four monomers. One monomer is terephthalic acid or an ester thereof and another is 1,4-cyclohexane dimethanol (cis, trans, or a mixture of cis and trans isomers). The third monomer is a dicarboxylic acid having at least two ($C_4$–$C_6$) carboxylic rings or an ester thereof. The fourth monomer is a glycol or still another carbocyclic dicarboxylic acid.

BACKGROUND OF THE INVENTION

Field of the invention

This invention relates to copolyesters and their preparation. It is more particularly concerned with amorphous copolyesters having high heat distortion temperature and high impact strength made from the copolyesterification of four monomers.

Description of the prior art

U.S. Pat. No. 2,901,466 is directed to copolyesters of 1,4-cyclohexane dimethanol with one or more dicarboxylic acids. These polymers are crystalline and exhibit a crystalline melting point. They do not appear to have high impact properties.

In copending application S.N. 643,395 filed concurrently herewith there is described a three component polyester of 1,4-cyclohexane dimethanol with two dicarboxylic acids. These polymers are amorphous and have a high impact strength. However, when heated at about 100° C. they become crystalline and lose impact strength. Hence, these copolyesters are limited in their use to applications wherein temperature is not a factor.

SUMMARY OF THE INVENTION

It is the discovery of this invention that copolyesters can be produced that are amorphous and remain amorphous even when heated. Thus they retain high impact properties.

Accordingly, the present invention provides copolyesters of terephthalic acid, 1,4-cyclohexane dimethanol, a dicarboxylic acid having two ($C_4$–$C_6$) carbocyclic rings, and a glycol or a third carbocyclic dicarboxylic acid.

DESCRIPTION OF SPECIFIC EMBODIMENTS

Two monomer components of the copolyesters of this invention are terephthalic acid and 1,4-cyclohexane dimethanol. Within the contemplation of this invention the terephthalic acid can be used as such or as a lower ($C_1$–$C_4$) alkyl diester. Further when a glycol is one of the monomer components the glycol can be pre-reacted with the terephthalic acid or the lower alkyl diester, to form hydroxyl containing esters such as bis-(2-hydroxyethyl) terephthalate or the "pre-polymer," i.e., low molecular weight, partially polymerized bis-(2-hydroxyethyl) terephthalate. The 1,4-cyclohexane dimethanol reactant can be in the cis or trans form or it can be a mixture of cis and trans isomers.

The third component of the copolyester of this invention must be a dicarboxylic acid containing two $C_4$–$C_6$ carbocyclic groups. They can be acids having the general formula:

HOOC—A—X—B—COOH wherein A and B are same or dissimilar carbocyclic groups containing 4–6 carbon atoms, such as cyclobutylene, cyclopentylene, cyclopentenylene, cyclohexylene, cyclohexenylene and phenylene; and X is a divalent linking group, such as —$SO_2$—, —$SO_3$—, —O—, —S—, and

(R and R' are $C_1$–$C_3$ alkyl). It is also within the contemplation of this invention to use dicarboxylic acids having non-linked carbocyclic groups, i.e., directly joined groups, such as diphenyl dicarboxylic acids and dicyclohexyl dicarboxylic acids, and fused groups, such as naphthalene dicarboxylic acids. It is also contemplated to use dicarboxylic acids in which the carbocyclic groups are joined by a linking group that is fused to one of the carbocyclic groups, such as phenylindane dicarboxylic acids.

As in the case of terephthalic acid, the third monomer component can be used as the acid or as the di-lower alkyl ($C_1$–$C_4$) ester. If a glycol is used, this acid can be esterified therewith or with the 1,4-cyclohexane dimethanol, as the regular diester or as a "pre-polymer." Typical dicarboxylic acids (and the esters and "pre-polymer" thereof) used as the third monomer component are: p,p'-sulfonyldibenzoic acid, m,p'-sulfondibenzoic acid; m,m'-sulfonyldibenzene acid; p-carboxyphenyl, p'-carboxybenzenesulfonate; m-carboxyphenyl, p'-carboxybenzenesulfonate; m,p'-isopropylidenedibenzoic acid; p,p'-isopropylidenedibenzoic acid; 2,2-di(p-carboxyphenyl) butane; 3,3-di(p-carboxyphenyl) pentane; 2,6-naphthalenedicarboxylic acid, 1,8-naphthalenedicarboxylic acid; p,p'-diphenyldicarboxylic acid; m,p'-diphenyldicarboxylic acid; 4,4'-dicyclohexanedicarboxylic acid; and various other acids having the following representative formulae:

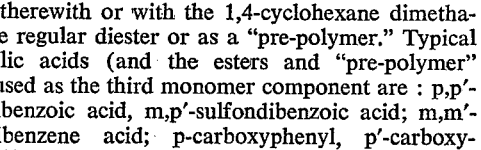
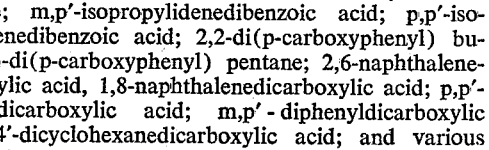
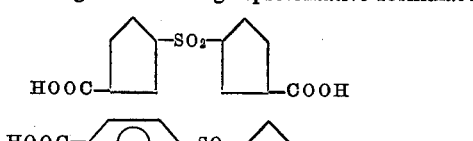
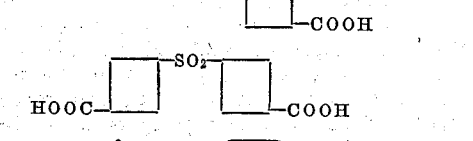
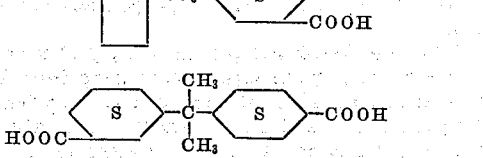
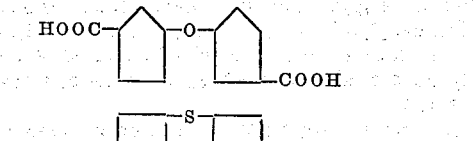
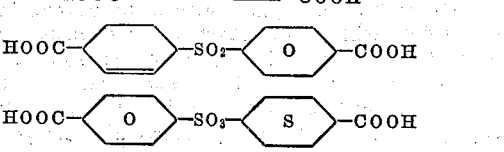

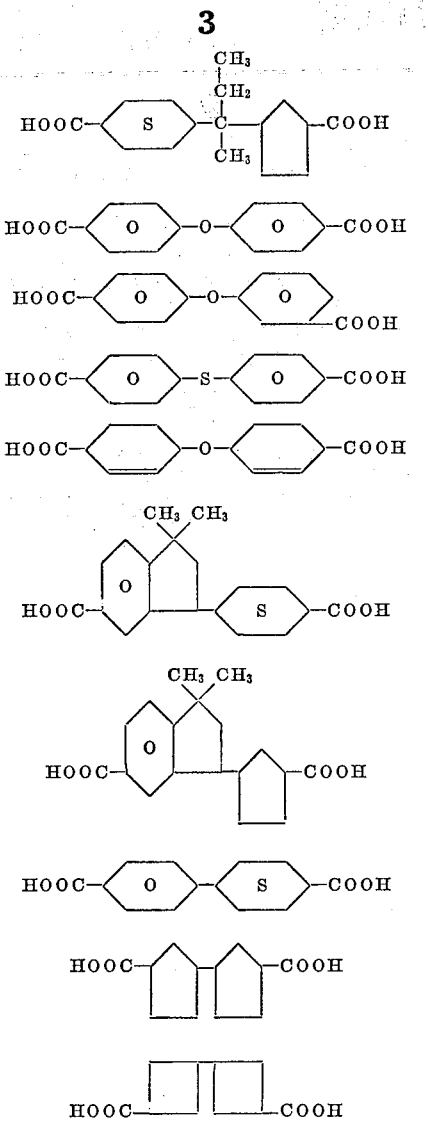

If desired these dicarboxylic acids can contain ring substituents which will not interfere with the copolyesterification reaction, such as alkyl, halogen, and aryl.

The fourth monomer component of the copolyesters of this invention can be a carbocyclic dicarboxylic acid, other than terephthalic acid and that used as the third component, or it can be a glycol. When the fourth component is an acid, it can be one selected from the aforedescribed third component group or it can be a single carbocyclic dicarboxylic acid such as isophthalic acid; 5 - t - butylisophthalic acid; 1,4-cyclohexanedicarboxylic acid.

When the fourth component is a glycol it can be one of the polymethylene glycols containing from 2–10 carbon atoms, such as ethylene glycol, propylene glycol, 1,5-pentanediol, and 1,10-decanediol. It is also contemplated, but less preferred, to use ether glycols, such as diethylene glycol and triethylene glycol. Branched chain aliphatic glycols can be employed, including 2,2-dimethyl-1,3-propanediol and 2-methyl-1,5-pentanediol. Carbocyclic glycols can also be used, such as 1,4-di(hydroxyethyl) benzene.

The molar proportions of monomer components used to prepare the copolyesters of this invention can be varied to some extent. During the course of the polycondensation excess diols will be evaporated from the reaction mixture, so that in the finished polymer dicarboxylic acids and diol will be present in a 1:1 molar ratio. Thus, the acid components and the diol(s) will be present in the final copolyester in the following ranges of mole percent of acid and of mole percent of diol(s), depending upon the fourth component selected:

With 2 dicarboxylic acids+2 diols:
  (a) First component—TPA _____ [1] 15–85
  (b) Third component dicarboxylic acid _____ [1] 85–15
  (c) Second component—CHDM _____ [2] 98–40
  (d) Fourth component—other diol _____ [2] 2–60

With 3 acids+CHDM:
  (a) First component—TPA _____ [1] 15–85
  (b) Third component dicarboxylic acid _____ [1] 85–15
  (c) Fourth component dicarboxylic acid ____ [1] 85–15
  (d) Second component CHDM=100 mole percent of diol.

[1] Mole percent of acids.
[2] Mole percent of diols.

The copolyesterification reaction can be advantageously facilitated by the employment of a catalyst. The best catalyst for each reaction is determined by the nature of the reactants. Generally, when an alkyl ester of the acidic compound is being employed, an ester interchange type of catalyst is to be preferred. Numerous patents have issued in the last few years describing numerous advantageous catalysts which can be employed. Various techniques as to the use of the catalysts are well known in the art. For example, if the free acid is being reacted with the free glycol, a catalyst need not be added until after the preliminary condensation has gotten underway.

The reaction is generally begun in the presence of an excess of the glycol and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly polymeric condensation product produced as just described can be cooled, pulverized, and the powder heated to a temperature somewhat less than that employed during the last stage of the molten phase polymerization, thereby avoiding coagulation of the solid particles. The solid phase polymerization is advantageously conducted until the desired degree of polymerization is achieved. The solid phase polymerization, among other things, results in a higher degree of polymerization without the accompanying degradation, which frequently takes place when continuing the last stage of the melt phase polymerization at a temperature high enough to achieve the desired degree of polymerization. The solid phase process is advantageously conducted with agitation employing an inert atmosphere at either normal atmospheric pressure or under a greatly reduced pressure.

The advantageous results obtained in accordance with this invention by using, as the third component, a dicarboxylic acid containing two carbocyclic groups is demonstrated in the following examples. Particularly, this advantage is demonstrated by comparing Examples 1 and 2.

EXAMPLE 1

A mixture of dimethyl terephthalate (DMT) (48.5 g., 0.25 mole), dimethyl trans-1,4-cyclohexane dicarboxylate (50 g., 0.25 mole), 1,4-cyclohexane dimethanol (CHDM) (144 g., 1.0 mole) and calcium acetate (0.042 g.) was placed in a three-necked glass reactor, equipped with a stirrer, and nitrogen gas inlet tube. The mixture was heated at 225° C. for two hours. The ester interchange was rapid. Tetrabutyl titanate (10 drops) was then added and the temperature was increased to 300° C. After 2 hours at this temperature, the reaction system was put under reduced pressure (0.5 to 1 mm.). The reaction mixture became very viscous within an hour. After 1.5 hours at reduced pressure, the reaction was brought to atmospheric pressure with nitrogen and the clear hard polymer was removed. The RSV of this polymer in a mixture of phenol and tetrachloroethane (50:50 percent by wt.) was 0.87 at 25° C. The injection molded bars showed Izod impact values (ASTM D256–56) in the range of 26 ft. lbs./inch notch. The clear injection molded bars became white and crystalline in the course of an hour when heated to 100° C. These white crystalline bars were very brittle and showed no impact property.

EXAMPLE 2

The reaction was done essentially in the same manner as described in Example 1. The only difference was the use of p,p'-isopropylidene dibenzoic acid. The polycondensation reaction mixture comprised of DMT (48.5 g., 0.25 mole), dimethyl-trans-1,4-cyclohexane dicarboxylate (40 g., 0.20 mole) p,p'-isopropylidene dibenzoic acid dimethyl ester (15.6 g., 0.05 mole) and CHDM (144 g., 1.0 mole). The copolyesters containing four types of structural units was very hard and did not show the tendency to crystallize. It showed Izod impact values as high as 26 ft. lbs./inch notch.

EXAMPLE 3

In this example the fourth component in the final copolyester was introduced by starting with bis-(2-hydroxyethyl) terephthalate, a monomer that can be prepared either from terephthalic acid or dimethyl terephthalate and ethylene glycol.

A mixture of bis-(2-hydroxyethyl) terephthalate (333.72 g., 1.34 moles), p,p'-sulfonyl dibenzoic acid dibutyl ester (183 g., 0.44 mole) and CHDM (252.4 g., 1.0 mole) and calcium acetate (0.126 g.) was placed in the three-necked flask as described in Example 1. The mixture was heated to 225° C. After one hour at this temperature, thirty drops of tetrabutyl titanate were added and the reaction mixture was heated to 300–310° C.

The reaction system was taken to reduced pressure (0.1 mm.) after two hours. A very hard, clear polyester with an RSV of 0.94 was obtained after one hour reaction time, under reduced pressure. This copolyester did not show any tendency to crystallize and the Izod impact values in the range of 24–28 ft. lbs./inch notch were obtained for injection molded bars.

EXAMPLE 4

A mixture of bis-(2-hydroxyethyl) terephthalate (182.67 g., 0.72 mole), bis-(2-hydroxyethyl)p,p'-isopropylidene dibenzoate (267.3 g., 0.72 mole) and 1,4-cyclohexane dimethanol (216.0 g., 1.5 moles) and calcium acetate (0.126 g.) contained in the usual reaction flask was placed in an oil bath at 200° C. After 2 hours at 200° C. to the reaction mixture was added 30 drops of tetrabutyl titanate catalyst. The temperature was increased to 300° C., the distillate being collected in the meantime. The reaction system was brought under reduced pressure after heating the reaction mixture at 300° C. for 1.5 hours. Within the course of ½ hour, the reaction mixture became very viscous and could not be stirred any further. As described previously, the polymer was removed after bringing the system to atmospheric pressure. RSV of the polymer was 0.90. It did not show the tendency to crystallize and showed Izod values as high as 28 ft. lbs./inch notch. X-ray analysis showed the polyester to be completely amorphous.

EXAMPLE 5

This reaction was done in a similar manner as described in Example 4. The impact resistant polyester was prepared from the following reactant ratio:

bis-(2-hydroxyethyl) terephthalate (302.4 g., 1.19 moles)
bis - (2 - hydroxyethyl)-p,p'-isopropylidene dibenzoate (147.6 g., 0.40 mole)
1,4-cyclohexane dimethanol (216 g., 1.50 moles)

The copolyester prepared from these reactants showed Izod impact values in the range of 25 ft. lbs./inch notch. RSV of the copolyester was 1.07. It did not show the tendency to crystallize.

EXAMPLE 6

A mixture of terephthalic acid (56.3 g., 0.339 mole), p,p'-sulfonyl dibenzoic acid (103.84 g., 0.339 mole), ethylene glycol (42.1 g., 0.678 mole), 1,4-cyclohexane dimethanol (97.8 g., 0.678 mole), calcium acetate (0.042 g.) and ten drops of tetrabutyl titanate were placed in the previously described equipment. The reaction mixture was directly placed in an oil bath at 200° C. The pasty reaction mixture was stirred at this temperature for ½ hour. The temperature of the oil bath was then increased to 300° C. during the course of ½ hour. The temperature of the oil bath was then increased to 300° C. during the course of ½ hour. The reaction mixture became homogeneous and it was kept at this temperature and atmospheric pressure for ½ hour. The reaction mixture became very viscous by this time. The system was then put under reduced pressure the reaction mixture became extremely viscous and could not be stirred. The clear, hard copolyester was removed from the flask after bringing the reaction system to atmospheric pressure. RSV of the polymer was 0.88 at 23° C. The injection molded bars showed Izod values in the range of 28 ft. lbs./inch notch. The polymer did not show the tendency to crystallize. Chemical analysis of the copolyesters prepared this way showed 2 to 10 mol percent of ethylene glycol in the macro molecule.

As has been indicated hereinbefore, the third component dicarboxylic acid must be one having two carboxylic groups. No advantage appears to be obtained by using a monocyclic dicarboxylic acid. This is demonstrated by the following examples.

EXAMPLE 7

A mixture of bis-(2-hydroxyethyl) terephthalate (85.63 g., 0.339 mole), dimethyl isophthalate (65.9 g., 0.339 mole), 1,4-cyclohexane dimethanol (97.8 g., 0.678 mole) and tetrabutyl titanate (10 drops) contained in the usual reaction flask was placed in an oil bath at 150° C. for 1.5 hours. After 1.5 hours, the temperature of the oil bath was increased to 200° C., the distillate being collected in the meantime. The reaction system was kept at this temperature for 2 hours. The oil bath temperature was then increased to 300° C. After 2 hours at 300° C., the reaction system was brought under reduced pressure. After ½ hour at reduced pressure, the reaction mass became very viscous and could not be stirred further.

As described previously, the polymer was removed, after bringing the system to atmospheric pressure. RSV of the polymer was 1.05.

This polymer was amorphous and showed good Izod impact values (8–12 ft. lbs./inch notch). However, is crystallized easily on heating. Once it crystallized, the polymer showed no impact properties.

EXAMPLE 8

Following the procedure given in the above example a copolyester composition was prepared from bis-(2-hydroxyethyl) terephthalate (447.75 g., 1.76 moles), dimethyl isophthalate (113.94 g., 0.587 mole) and 1,4-cyclohexane dimethanol (338.53 g., 2.35 moles). The polymer had a RSV of 0.88 and the Izod impact values varied from 0.2 to 1.2. X-ray measurements showed it to be 35 percent crystalline.

The following examples illustrate the use of other dicarboxylic acid reactants in the polyesters of this invention.

EXAMPLES 9 THROUGH 12

Copolyesters containing four components were prepared by using the procedure described in Example 4, but using other acids instead of the p,p'-isopropylidene dibenzoic acid. Ethylene glycol component in the final product is derived from bis-(2-hydroxyethyl)-terephthalate (bis-HET). The components used, their amounts, and pertinent results are set forth in the table.

TABLE

| Example | bis-HET, g./mole | Other Comonomer | 1,4-cyclohexane dimethanol, g./mole | RSV | Tg, °C. | Izod, ft. lbs./inch notch |
|---|---|---|---|---|---|---|
| 9 | 91.73/0.361 | 1,3,3-trimethyl-1-phenyl-indane-4',6-dicarboxylic acid dimethyl ester, 42.38 g., 0.120 mole. | 65.89/0.457 | 0.66 | 95 | 1.2–2.8 |
| 10 | 50.52/0.198 | 1,3,3-trimethyl-1-phenyl-indane-4',6-dicarboxylic acid dimethyl ester, 70.03 g., 0.198 mole. | 54.45/0.378 | 0.69 | 136 | 1.92 |
| 11 | 98.1/0.386 | 2,6-naphthalene dicarboxylic acid dimethyl ester, 31.42 g., 0.129 mole | 70.47/0.487 | 0.98 | 100 | 1.68–2.8 |
| 12 | 77.34/0.304 | 4,4'-Biphenyl dicarboxylic acid dimethyl ester, 20.56 g., 0.076 mole | 52.10/0.361 | 0.90 | 101 | 16 |

As has been indicated hereinbefore, the components of the copolyesters of this invention can be introduced in various forms, e.g., as the acid itself or its lower alkyl ester plus glycol as the ester of one or both acids with the glycol, or as the glycol ester of one acid (or its prepolymer) plus another acid (or its ester) and glycol. An effective way to prepare these copolyesters is to use a prepolymer of one acid with glycol and a prepolymer of another acid with another glycol.

This is illustrated in the following example. The prepolymers are low molecular weight linear polyesters having an average degree of polymerization of from about 3 to 20.

EXAMPLE 13

A mixture of p,p'-isopropylidene dibenzoic dimethyl ester (50 g., 0.160 mole), 1,4-cyclohexane dimethanol (34.61 g., 0.24 mole), calcium acetate (0.02 g.) and tetrabutyl titanate (3 drops) was placed in the polymerization reactor. The reaction flask was placed in an oil bath at 200° C. After keeping the reaction mixture at 200° C. for 1.5 hours, the temperature of the oil bath was increased to 285° C. (0.5 hr.), the distillate being collected in the meantime. The reaction mixture was kept at 285° C. for 0.5 hour. The reaction system was then brought under reduced pressure (0.1 mm.) and kept under reduced pressure for 10 minutes. The prepolymer was removed from the flask after bringing the reaction mixture to atmospheric pressure. The RSV of the prepolymer was 0.29.

EXAMPLE 14

A mixture of polyethylene terephthalate prepolymer (50 g.) and the prepolymer prepared from 1,4-cyclohexane dimethanol and p,p'-isopropylidene dibenzoate dimethyl ester, as described in Example 13 (24.4 g.) was placed in the polymerization equipment. Six drops of tetrabutyl titanate were added to the reaction mixture and the equipment was placed in an oil bath at 250° C. During the course of 1 hour the reaction mixture became homogeneous. After keeping the reaction mixture at 250° C. for 1 hour, the temperature was raised to 285° C. The distillate was collected in the meantime. The reaction mixture became very viscous during the course of 0.5 hour at 285° C. (0.1 mm.). The polymer was removed after bringing the reaction system to atmospheric pressure. The amorphous copolyester was very hard and showed high impact properties. The RSV of the polymer was 0.93 at 25° C. in the phenol:tetrachloroethane (50:50 by weight) system. The copolyester did not show the tendency to crystallize.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A moldable amorphous copolyester of (a) terephthalic acid, (b) 1,4-cyclohexane dimethanol, (c) a dicarboxylic acid having two ($C_6$) carbocyclic rings with a carboxyl group on each ring, and (d) a glycol other than (b) or a third carbocyclic dicarboxylic acid, wherein the dicarboxylic acid components and the diol components are present in a 1:1 molar ratio and when (d) is a glycol, 15–85 mole percent of acid components (a) and (c) is terephthalic acid and 85–15 mole percent of acid components is (c) and 40–98 mole percent of diol components (b) and (d) is 1,4-cyclohexane dimethanol and 60–2 mole percent of diol components is (d); and when (d) is a third carbocyclic dicarboxylic acid, 15–85 mole percent of acid components (a), (c), and (d) is terephthalic acid and 85–15 mole percent of acid components is (c) and (d) and 100 mole percent of diol components is (b).

2. The amorphous copolyester of claim 1, wherein (c) is p,p'-isopropylidene dibenzoic acid and (d) is trans-1,4-cyclohexane dicarboxylic acid.

3. The amorphous copolyester of claim 1, wherein (c) is p,p'-sulfonyl dibenzoic acid and (d) is ethylene glycol.

4. The amorphous copolyester of claim 1, wherein (c) is p,p'-isopropylidene dibenzoic acid and (d) is ethylene glycol.

5. The amorphous copolyester of claim 1, wherein (c) is 4,4'-biphenyl dicarboxylic acid and (d) is ethylene glycol.

6. The method for making an amorphous copolyester of claim 1 wherein (d) is a glycol other than (b), which comprises reacting a prepolymer of (a) and (d) with a prepolymer of (c) and (b), in the presence of a polyesterification catalyst.

7. The method of claim 6, wherein (d) is ethylene glycol and (c) is p,p'-isopropylidene dibenzoic acid.

References Cited

UNITED STATES PATENTS

| | | | |
|---|---|---|---|
| 2,901,466 | 8/1959 | Kibler et al. | 260—75 |
| 3,110,547 | 11/1963 | Emmert | 260—75 |
| 3,161,710 | 12/1964 | Turner | 260—75 |
| 3,313,778 | 4/1967 | Sakurai. | |

FOREIGN PATENTS 110,909   3/1965   Netherlands.

WILLIAM H. SHORT, Primary Examiner

L. P. QUAST, Assistant Examiner

U.S. Cl. X.R.

260—47

PO-1050
(5/69)

UNITED STATES PATENT OFFICE
CERTIFICATE OF CORRECTION

Patent No. 3,522,215          Dated July 28, 1970

Inventor(s) Kashinath S. Sardessai and Michel E. Mullier

It is certified that error appears in the above-identified patent and that said Letters Patent are hereby corrected as shown below:

Column 1, line 19: "carboxylic" should be --carbocyclic--.

Column 2, line 29: "m,p'-sulfondibenzoic" should be --m,p'-sulfonyldibenzoic--.

Column 2, line 30: "m,m'-sulfonyldibenzene" should be --m,m'-sulfonyldbenzoic--.

Column 6, lines 19 et seq.: "The temperature of the oil bath was then increased to 300°C. during the course of 1/2 hours." Line is repeated and should appear only once.

Column 6, line 37: "carboxylic" should be --carbocyclic--.

Column 6, line 60: "is crystallized" should be --it crystallized--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents